G. R. McINTIRE.
Measuring Cloth.
No. 77,305.  Patented April 28, 1868.
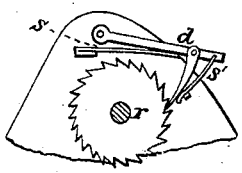
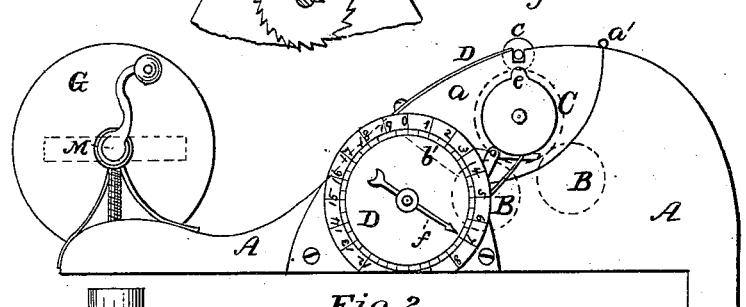
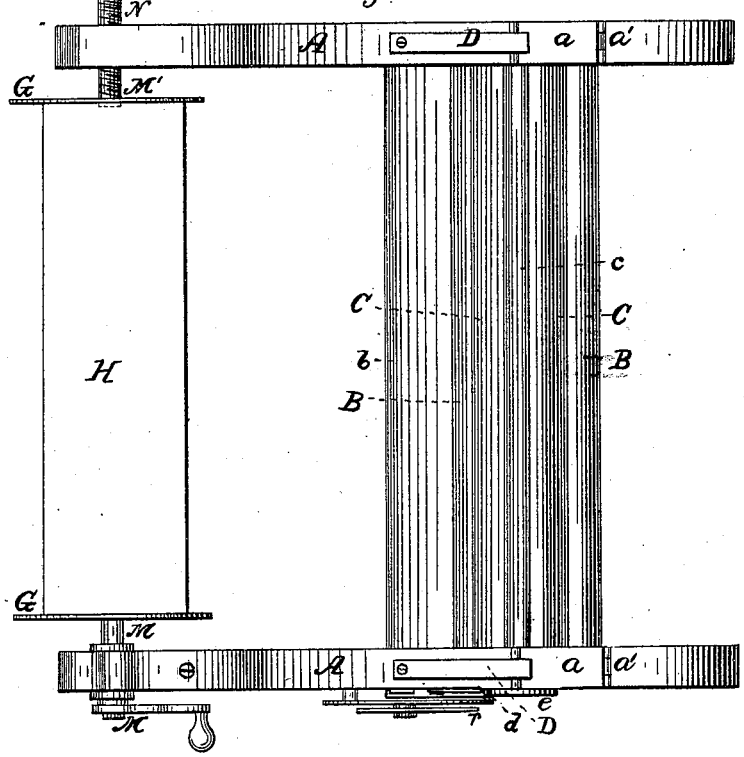
Witnesses:  Inventor:

United States Patent Office.

GEORGE R. McINTIRE, OF HOUGHTON, MICHIGAN.

Letters Patent No. 77,305, dated April 28, 1868; antedated April 16, 1868.

IMPROVEMENT IN APPARATUS FOR MEASURING CLOTH.

*The Schedule referred to in these Letters Patent and making part of the same.*

TO ALL WHOM IT MAY CONCERN:

Be it known that I, GEORGE R. McINTIRE, of the city and county of Houghton, and State of Michigan, have invented a new and improved Cloth-Roller and Measurer; and I do hereby declare the following to be a full, clear, and exact description of the same, reference being had to the accompanying drawings, forming part of this specification, and in which—

Figure 1 is a side elevation of my invention.

Figure 2 is a top view of the same; and

Figure 3 shows the ratchet-wheel, $r$, and the operating-apparatus.

Similar letters of reference indicate corresponding parts in the several figures.

In this invention the cloth is passed between two rollers, which are rotated by its motion, and the revolutions of which are recorded by a registering-apparatus.

In order that others skilled in the art to which my invention appertains may be enabled to make and use the same, I will proceed to describe it in detail.

In the drawings, A A is the frame of my apparatus, in the side-pieces of which bear two parallel rollers, B B, over which the cloth passes, and a roller, C, above and between them, which rests upon the cloth, and is rotated by it as it passes over the lower rollers B B. The journals of the roller C bear in boxes resting on elastic cushions, and a small roller, $c$, runs directly above it in contact with it, and pressed down upon it by the force of a spring, D, by which the roller C is kept in contact with the cloth, and yet will adjust itself to different thicknesses of material.

For the purpose of enabling the cloth to be more readily inserted between the rollers, the upper rollers C $c$ are made to bear in separate pieces, $a a$, of the frame A, hinged to it at $a'$. These pieces, with the rollers attached, can be turned back, exposing the upper surface of the rollers B B, and leaving a space several inches in width, through which the cloth can be readily inserted and attached. The pieces $a a$ may be connected and strengthened by a cross-bar, $b$, and when shut down in position for working the machine, may be still further steadied and strengthened by a pin or blade, $b'$, in the frame entering a hole or groove in the movable piece.

The recording-apparatus is very simple and exact, consisting of a cam, $e$, fixed to the projecting end of the roller C or its journal, and at every revolution of the roller striking once, or oftener if desired, against a hinged dog, $d$, and causing the latter to move a ratchet-wheel, $r$, one degree, or through a space equal to the distance between two of its adjoining teeth. A small spring, $s$, keeps the dog $d$ in contact with the revolving cam $e$, and another, $s'$, presses the dog against the ratchet-wheel. The shaft of the ratchet-wheel projects through a dial, D, and bears a finger, $f$, which indicates every revolution of the roller C by moving forward one degree upon the dial.

The degrees on the dial correspond to revolutions of the roller C. If the circumference of the roller C is one-quarter of a yard, then every degree on the dial will indicate one-quarter of a yard; if one yard, every degree will indicate one yard, &c., &c. The indicating-apparatus can be extended at pleasure, like the indicators of gas and water-meters, so as to record every ten yards, hundred yards, &c., measured by the machine.

For the purpose of moving the cloth and rolling it up in a convenient manner for handling, at the same time that it is measured, the shafts, M M', are provided, one, M, having a crank-shaft for the purpose of turning it; and the other, M', bearing in a box supported by the screw N, by means of which it may be screwed towards or from the opposite roller, and thus adjusted to cloths of different width.

A circular guide, G G, is attached to each roller, to guide the cloth and cause it to roll evenly upon the cloth-board H. The latter is any ordinary board upon which merchants roll cloth, and when in position, as shown in the drawings, is held by chucks.

The machine is operated by passing the cloth over the roller B B and under the roller C, and attaching its end to the board H. If the latter is situated a quarter of a yard from the axis of the roller C, the index should be moved one degree before the machine is started, to indicate that quarter. The board H is then caused to revolve, by means of the crank-shaft M, by which the cloth is drawn between the rollers, B, B, and C, causing the surface of the latter to travel just as fast as the cloth. The amount of cloth wound up on the board H is thus accurately measured and recorded upon the dial.

Having thus described my invention, what I claim as new, and desire to secure by Letters Patent, is—

1. The combination and arrangement of the three rollers B, B, C, with the cam $e$, hinged dog $d$, ratchet-wheel $r$, dial D, index $f$, and movable frame $a$, the whole operating substantially in the manner and for the purposes indicated.

2. The cloth-measuring instrument above described, consisting of the parts referred to in the first clause of this claim, in combination with the shafts M M', screw N, guides G G, and board H, all constructed, arranged, and combined, substantially as and for the purposes specified.

To the above specification of my improvement I have signed my hand, this twenty-sixth day of July, 1867.

GEO. R. McINTIRE.

Witnesses:
CHARLES A. PETTIT,
SOLON C. KEMON.